United States Patent Office 2,987,439
Patented June 6, 1961

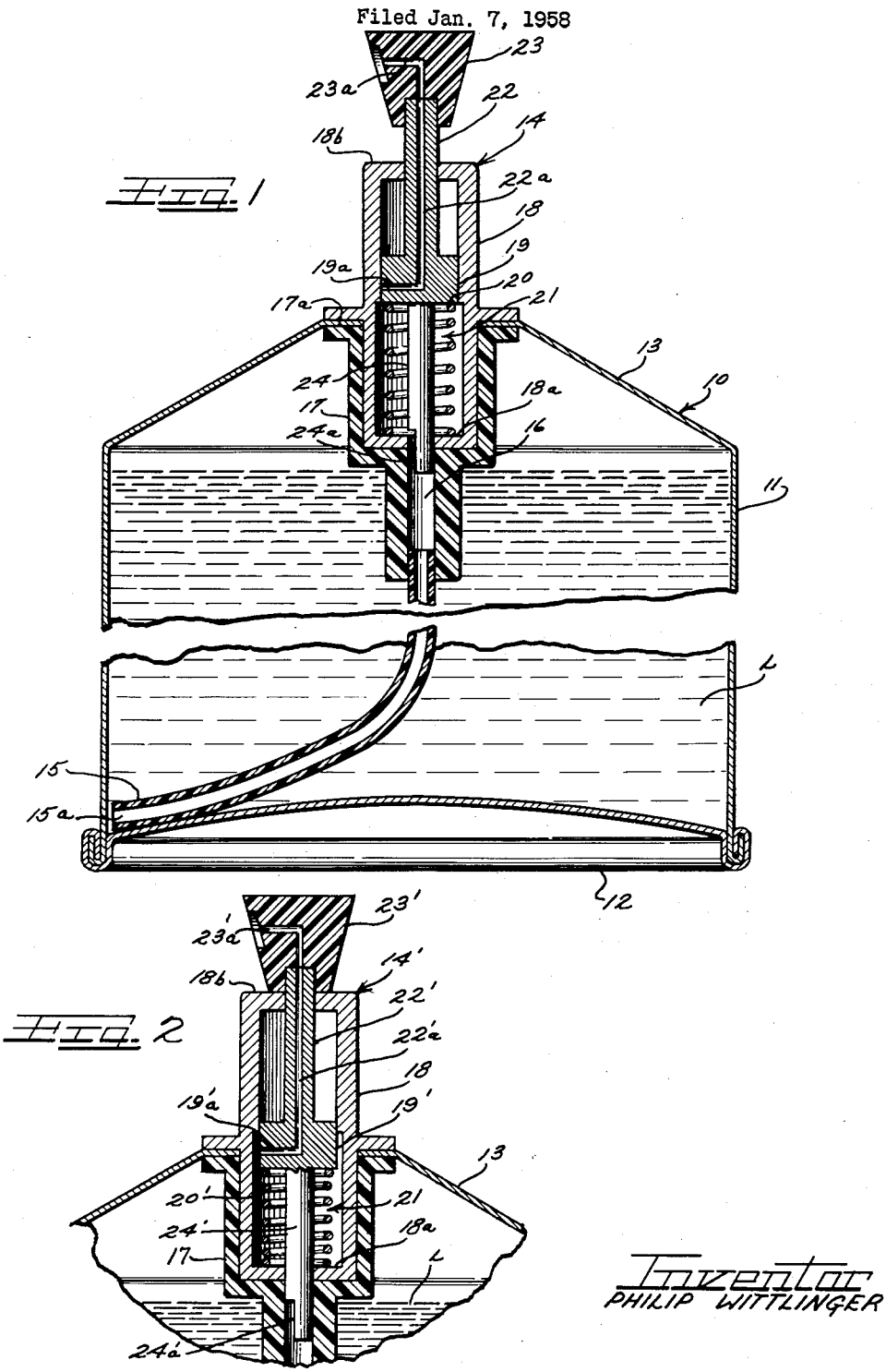

2,987,439
METHOD OF APPLYING AN AEROSOL TO THE EYE
Philip Wittlinger, Chicago, Ill., assignor to William Cooper & Nephews, Inc., Chicago, Ill., a corporation of Illinois
Filed Jan. 7, 1958, Ser. No. 707,545
2 Claims. (Cl. 167—59)

The instant invention relates to the administration of medicinal compositions, and more particularly, to a method of administering a unit dosage of medication to plant and/or animal tissue.

The administration of medicinal compositions to plant and animal tissue is an old art, involving a number of different methods of administration or application of the medicinal composition to the plant or animal tissue. The instant invention is particularly adapted for the application of such medicinal compositions to plant or animal tissue sensitive to freezing temperatures. The instant invention is also particularly adapted to the administration of the desired amount or dosage (within reasonable tolerances) of a medicinal composition to the tissue. As used herein, the medicinal composition used may be any of a number of different types of medicinal compositions, including antiseptics, bactericides, fungicides, antibiotics, local anesthetics, and the like.

Although the instant invention has use in the application of medication to all plant and animal tissue sensitive to freezing temperatures, the instant invention is particularly adapted for use in the administration of medication for pinkeye in cattle and other livestock. This is a very serious disease with cattle and similar livestock and great difficulty has been encountered in combating this disease. Salves have been suggested, but these are difficult to administer, because of the tendency for the animal to blink his eyes. The squirting of powders or liquids has also been tried, and this gives a faster application to the eye, so that blinking does not present as serious a problem, but these methods of administration leave much to be desired. A certain minimum amount of medication must be applied in order to effectively combat pinkeye; and amounts appreciably above this minimum amount of medication are only wasted if an excess is applied.

The spraying methods using superatmospheric air or a similar gas as the propellant are known, but these methods leave something to be desired in that a source of compressed air or gas must be employed and any of such spraying methods do not afford a control as to the amount of medication applied. It must be appreciated that relatively unskilled operators are employed for the purpose of treating the animals; whereas even highly skilled operators would have great difficulty in administering precisely the correct amount of medication. The instant invention avoids the necessity for the provision of a separate source of compressed air or similar gas as a propellant, in that the instant invention uses a so-called "aerosol" propellant. Aerosol propellants and the aerosol packages for effecting aerosol spraying are generally well known.

For example, in U.S. Patent No. 2,659,704, issued to Robert J. Kerr, there is described a self-spraying artificial snow composition. This composition is sprayed through an aerosol package against a pine tree, equipped with suitable Christmas decorations, to provide a simulated snow on the tree. It will be appreciated that the pine tree does not have plant tissue that is sensitive to freezing temperature, but rather has plant tissue that is insensitive to freezing temperature. It will be noted, however, that if one sprays the palm of the hand with a self-spraying artificial snow composition for a period of only five or ten seconds, the exposed skin tissue is frozen (as indicated by the creation of a white spot on the palm of the hand and the sensation of some slight pain). Such freezing of sensitive plant or animal tissue such as the eye would, of course, cause serious damage.

The instant invention guards against the possibility of any such damage to the eye or similar sensitive tissue, by providing for metering of the total amount of material sprayed against the eye in a single spraying operation. The instant invention thus involves the spraying of the eye or similar sensitive tissue with a small amount of "self-spraying" material containing the required dosage and also containing such a small amount of propellant that an appreciable temperature reduction is not effected in the eye tissue. The instant invention provides for the actual metering of a small amount of self-spraying solution (while still under pressure) from the body of the solution contained in the package under pressure. This metered small amount of solution is then sprayed against the eye of the animal. By first isolating this small amount of solution from the main body of solution and then spraying the same against the eye, the possibility of spraying too much solution against the eye through careless manipulation of the ordinary aerosol package is avoided. Also, the possibility of applying an insufficient amount of medication is also avoided. The metered amount of solution that is isolated from the main body of the solution contains a unit dosage of medication plus a sufficient amount of propellant to effect propulsion against the eye. This amount of propellant is, however, insufficient to freeze the eye (and preferably insufficient to reduce the tissue temperature more than 10° F.). The metered spraying of a predetermined small amount of solution is accomplished by the use of a metering valve which is not itself new. The metering valve automatically collects and isolates a small predetermined volume of the solution within the aerosol package or can; and then, when actuated, the metering valve releases only this small portion of liquid which it has isolated. This prevents the possibility of the release of substantial quantities of solution so as to cause freezing or similar damage to the eye tissue. This arrangement also avoids the possibility of administering too little medication.

It is, therefore, an important object of the instant invention to provide an improved method of administering a unit dosage of medication to plant and/or animal tissue sensitive to freezing temperatures.

It is a further object of the instant invention to provide a novel method of employing a selected predetermined amount of self-spraying material to spray medication against sensitive tissue in an amount insufficient to harmfully cool the tissue and an amount sufficient to apply the unit dosage of medication.

It is another object of the instant invention to provide a method of administering a unit dosage of medication to plant and animal tissue sensitive to freezing temperatures, which comprises providing a liquid containing the medication in a normally gaseous propellant under superatmospheric pressure, isolating a small portion of said liquid containing a unit dosage of medication while still under superatmospheric pressure, and then releasing said portion against said tissue at ambient atmospheric pressure, said portion containing less propellant than the amount which would freeze said tissue upon being so released against the tissue.

Other and further objects, features and advantages of the present invention will become apparent to those skilled in the art from the following detailed disclosure and the drawings attached hereto and made a part hereof.

On the drawings:

FIGURE 1 is a sectional elevational view of a package employed to contain the self-spraying medicated composition used in the practice of the instant invention, showing in section the metering valve employed (in the closed position); and FIGURE 2 is a fragmentary view showing a comparable view of the valve in a different position (in the open position).

As shown on the drawings:

In FIGURE 1, the reference numeral 10 indicates generally a package for dispensing the medicinal composition in accordance with the practice of the instant invention. The package 10 comprises a generally cylindrical metal can 11 having a sealed bottom 12 and a generally frusto-conical top 13 cooperating with a valve indicated generally at 14 to form a sealed container. This sealed container 11 retains a liquid L under pressure, and the liquid contains the desired medication and a normally gaseous propellant (preferably in a solution), which are under superatmospheric pressure so that the propellant is in liquid form. A discharge tube 15 extends from an open mouth 15a at the bottom of the can 11 up to the mouth 16 of a sealing housing 17, which sealingly engages the can roof 13 at 17a and which mounts the metering valve 14. The tube 15 and housing 17 are preferably made of a synthetic resin such as polyethylene.

In the position of the valve 14 shown in FIGURE 1, it will be seen that there is a cylindrical valve housing 18 axially receiving a piston or plunger 19 which sealingly engages the inner walls of the cylinder 18. A spring 20 is mounted in a lower chamber 21 in the valve 14 defined by the cylindrical walls 18 and the plunger 19. The spring 20 is secured to the bottom wall 18a of the cylinder and to the plunger 19, so as to resiliently prevent movement of the plunger 19 in either direction. The plunger 19 is connected at its top side to a hollow shaft 22 which passes out through the top 18b of the cylindrical housing 18 and mounts a manually graspable head 23. The passageway 22a of the hollow tube 22 communicates with the passageway 23a in the head 23 which in turn communicates with the atmosphere. When the valve 14 is properly actuated the propellant drives the composition up to the ambient atmosphere through the passageway 23 (and against the tissue to be treated). As shown in FIGURE 1, however, the passageway 22a is connected to a radially extending passageway 19a in the plunger 19 and the passageway 19a is sealed off against the side of the hollow housing 18. The lower side of the plunger 19 mounts a solid rod 24 which has a cutout portion 24a at its base defining with the cylinder housing bottom 18a a passageway for the liquid L under pressure, so that the liquid L may pass the cutout portion 24a and enter into and substantially fill the lower chamber 21 beneath the plunger 19. It will be appreciated that pressure applied against the liquid L in the can 11 is applied against a substantial area, so that the counteracting effect of pressure within the lower chamber 21 is negligible and the chamber 21 is substantially filled with liquid. In fact, the chamber 21 becomes filled with the predetermined metered amount of liquid that contains the unit dosage of medication.

In operation, a slight downward application of pressure on the head 23 moves the rod 24 downwardly so that it forms a seal with the housing bottom 18a (cutting off the passageway normally formed by the cutout portion 24a). At this point the predetermined amount of liquid under pressure is trapped in the chamber 21 and isolated from the body of the liquid L. Slight further downward movement results in the passageway 19a of the plunger 19 clearing the housing wall 18 and opening into the chamber 21. This position is shown in FIGURE 2, wherein parts that are shown in a position different from the position of FIGURE 1 are indicated by the prime of the same reference numeral. Before the port of conduit 19a' clears the wall of the cylindrical housing 18, the rod 24 has sealed off the bottom wall 18a; and as soon as the conduit 19a' clears the wall, the isolated small portion of liquid trapped in the chamber 21 is released to the ambient atmosphere. As here shown, the chamber 21 holds 100 mg. of liquid; but it may be altered in design so as to hold a quantity of liquid ranging from 10 mg. to 1000 mg. (or 1 g.). These small volumes of liquid are sufficient to retain (in solution) the medication and also to retain a sufficient amount of liquid to effectively propel the material out through the opening 23a'. The total amount of propellant in this small volume is, however, certainly insufficient to effect freezing of the tissue and is actually insufficient to prevent a reduction in the temperature of the tissue of as much as 10° F.

It will be appreciated that a single pressing of the head 23' to the position shown in FIGURE 2 results in the spraying of only the small dosage in the chamber 21. There is no position for the valve 14 which permits continuous spraying of liquid through the valve. The bottom of the chamber 21 is closed off before the port 19a' is opened thereto; and in the upstroke the port 19a' is closed before the cutaway portion 24a' clears the chamber bottom 18a to permit liquid to reenter the chamber 21.

In the practice of the instant invention the liquid is preferably composed of 25 to 80 (weight) percent of the normally gaseous propellant, with the medicinal component comprising the remaining 75% to 20%. The medicinal component may, of course, contain solvent ingredients ordinarily employed in conjunction with the ingredients which might be considered to be purely "medicinal." The actual "active" medicinal materials may compose a very minute portion of the total liquid composition. For example, a composition used for the treatment of pinkeye in cattle in the instant device (at dosages of 100 mg. in the chamber 21) has the following formulation:

40 parts "Freon 12" (dichlorodifluoromethane)
60 parts medication having the composition:
    0.1 % methyl violet
    1.0 % furfural
    0.05% tetrahydrofurfuryl alcohol
    2.0 % urea
    40.0 % isopropyl alcohol
    56.85% propylene glycol 100.00%

As used herein, the terms "parts" and "percent" mean parts and percent by weight unless otherwise specified. The above specified formulation used in 100 mg. volumes in the metering valve 14 have been found to be particularly effective in the treatment of pinkeye in cattle. This volume of material in a single dosage tends to reduce the eye tissue no more than a degree or two during application and it applies precisely the desired amount to the eye, so as to effect the application of an ideal unit dosage of medication to the eye, without any waste and without undertreatment.

It will be appreciated, however, that variations in the above formulation are permitted. For example, the methyl violet may range from 0.01% to 1%, the furfural may range from 0.1% to 5%, the tetrahydrofurfuryl alcohol may range from 0.01% to 0.1%; and the urea may be omitted completely or added in amounts as high as 5%. The isopropyl alcohol and propylene glycol have been found to be preferred for use in this particular composition, although other inert solvents may be used. Preferably such solvents are alcohols. The total alcohol content in the medication component may range from about 92 to about 98%.

It will be appreciated that other normally gas propellants may be used such as carbon dioxide, but preferably the propellant is a "Freon" gas propellant. Such propellants are recognized in the art as a class of polyhalogenated lower alkanes used generally as refrigerants. Such alkanes have not more than two carbon atoms (i.e., methane and ethane) and are at least trihalogenated with the lower molecular weight halogens (i.e., fluorine and chlorine), there being at least one fluorine (F) atom and at least one chlorine (Cl) atom in the molecule; and these compounds have the formula:

$$C_nClFXY_{(2n-1)}$$

wherein $n$ is an integer from 1 to 2, X is Cl or F, and Y is Cl, F or H. Examples: trichloromonofluoromethane, dichlorodifluoromethane, chlorotrifluoromethane, dichloromonofluoromethane, difluoromonochloromethane, trichlorotrifluoroethane, dichlorotetrafluoroethane, monochloropentafluoroethane, and chlorodifluoromethyl methane, which have boiling points ranging from about $-30°$ C. to 50° C.

A "gas propellant" is, of course, a gas under the conditions of use; in order to perform its function, it is stored under pressure (as a liquid) and released through an orifice to obtain the propellant effect (as a gas). The Freon gas propellants are thus gases at room temperature.

As will be appreciated, the liquid composition here used is preferably a solution of the medication in the liquefied gas propellant. In order to obtain such a solution, it may be necessary to include solvents in the medication. For example, the alcohol solvents are employed in the instant composition for the treatment of pinkeye. In such situations the active medicinal ingredient may be only 2 to 8% of the medication and the remainder is solvent for the active medicinal ingredient and compatible with the propellant. The medicinal active ingredient may be a sulfonamide, or it may be a fungicide for use on plants.

It will be understood that modifications and variations may be effected without departing from the spirit and scope of the novel concepts of the present invention.

I claim as my invention:

1. In a method of administering a unit dosage of medication to the eye of an animal, the improvement of providing a body of liquid containing the medication in a propellant under superatmospheric pressure, said propellant being gaseous under ambient temperature and pressure, and, while still under superatmospheric pressure isolating a small portion of about 10 mg. to 1 g. of said liquid containing a unit dosage of medication, and then releasing said portion against the eye at ambient atmospheric temperature and pressure, 20% to 75% of said liquid being the medication and the balance of 25% to 80% being a polyhalogenated lower alkane refrigerant propellant, the medication comprising 0.01% to 1% methyl violet in an inert solvent solution, the ratio of medication to propellant being sufficient to effect the application of the unit dosage to the eye using less propellant than the amount which would lower the eye temperature more than 10° F. upon being so released against the eye.

2. In a method of administering a unit dosage of medication to the eye of an animal, the improvement of providing a body of liquid containing the medication in a propellant under superatmospheric pressure, said propellant being gaseous under ambient temperature and pressure, and, while still under superatmospheric pressure isolating a small portion of about 10 mg. to 1 g. of said liquid containing a unit dosage of medication, and then releasing said portion against the eye at ambient atmospheric temperature and pressure, 20% to 75% of said liquid being the medication and the balance of 25% to 80% being a polyhalogenated lower alkane refrigerant propellant, the medication having a formulation consisting essentially of 0.01% to 1% methyl violet, 0.1% to 5% furfural, 0.01% to 0.1% tetrahydrofurfuryl alcohol, up to 5% urea, and the remainder isopropyl alcohol and propylene glycol, the ratio of medication to propellant being sufficient to effect the application of the unit dosage to the eye using less propellant than the amount which would lower the eye temperature more than 10° F. upon being so released against the eye.

References Cited in the file of this patent

UNITED STATES PATENTS

| | | |
|---|---|---|
| 2,205,785 | Benner | June 25, 1940 |
| 2,721,010 | Meshberg | Oct. 18, 1955 |
| 2,746,796 | St. Germain | May 22, 1956 |
| 2,782,975 | Bird | Feb. 26, 1957 |
| 2,801,201 | Kipnis | July 30, 1957 |

OTHER REFERENCES

Milks: Veterinary Pharmacology Materia Medica and Therapeutics, Sixth Edition, Alex Eger, Inc., Chicago, Illinois, pp. 581, 582.

Merck Index, Sixth Edition, 1952, Merck and Co., Rahway, N.J., pp. 988, 30, 546, 796, 797 and 941.

Merck Index, Sixth Edition, 1952, Merck and Co., Rahway, New Jersey, p. 447.

Shepherd: Proceedings of the Scientific Section Toilet Goods Association No. 22, December 1954, pages 30 and 31.